(12) United States Patent
Remez et al.

(10) Patent No.: US 12,313,862 B2
(45) Date of Patent: May 27, 2025

(54) GLINT ANALYSIS USING MULTI-ZONE LENS

(71) Applicant: APPLE INC., Cupertino, CA (US)

(72) Inventors: Roei Remez, Tel Aviv (IL); Ariel Lipson, Tel Aviv (IL); Itai Afek, Kfar Sava (IL); Jonathan Hauser, Ramat Gan (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/027,286

(22) PCT Filed: Sep. 15, 2021

(86) PCT No.: PCT/US2021/050370
§ 371 (c)(1),
(2) Date: Mar. 20, 2023

(87) PCT Pub. No.: WO2022/066478
PCT Pub. Date: Mar. 31, 2022

(65) Prior Publication Data
US 2023/0324587 A1    Oct. 12, 2023

Related U.S. Application Data

(60) Provisional application No. 63/081,378, filed on Sep. 22, 2020.

(51) Int. Cl.
*G02B 3/10*          (2006.01)
*G02B 27/00*         (2006.01)
(Continued)

(52) U.S. Cl.
CPC ........... *G02B 3/10* (2013.01); *G02B 27/0093* (2013.01); *G06F 3/013* (2013.01); *G06F 1/163* (2013.01)

(58) Field of Classification Search
CPC ...... G02B 2027/0178; G02B 2027/014; G02B 2027/0138; G02B 3/0081; G02C 11/10;
(Continued)

(56) References Cited

U.S. PATENT DOCUMENTS 9,465,991 B2    10/2016   Mei et al.
9,498,125 B2    11/2016   Caraffi et al.
(Continued)

FOREIGN PATENT DOCUMENTS

WO       2016/057435 A1    4/2016

OTHER PUBLICATIONS (PCT) European Patent Office (ISA/EP), International Search Report and Written Opinion of the International Searching Authority, International Application No. PCT/US2021/050370, 11 pages, Dec. 21, 2021.

*Primary Examiner* — Dong Hui Liang
(74) *Attorney, Agent, or Firm* — Thompson Hine LLP

(57) ABSTRACT

Various implementations disclosed herein include devices, systems, and methods that determines an eye characteristic (e.g., gaze direction, eye orientation, etc.) based on the determined location of the glint. For example, an example process may include producing a glint by producing light that reflects off a portion of an eye, receiving the reflected light at a sensor wherein the reflected light is received after passing through a multi-zone lens having a first zone and a second zone, the first zone and second zone having different energy-spreading characteristics, determining a location of the glint based on the reflected light received at the sensor, and determining an eye characteristic based on the determined location of the glint.

20 Claims, 11 Drawing Sheets

(51) Int. Cl.
*G06F 3/01* (2006.01)
*G06F 1/16* (2006.01)

(58) Field of Classification Search
CPC .......... G02C 7/083; G02C 7/101; G02C 7/08; G02C 7/06; G02C 7/02; G02F 2202/22; G06F 1/163; G06F 1/203; G06F 1/206; G06F 3/013; G06F 3/011; G06F 3/147; G06F 3/0304; G06F 3/012
See application file for complete search history.

(56) References Cited

U.S. PATENT DOCUMENTS

| | | |
|---|---|---|
| 10,354,136 B2 | 7/2019 | Sengelaub et al. |
| 10,775,628 B2 | 9/2020 | Samec et al. |
| 2005/0175218 A1* | 8/2005 | Vertegaal ................ G06T 7/254 345/157 |
| 2007/0206181 A1* | 9/2007 | Arenberg ................ G02B 3/08 356/124 |
| 2018/0120932 A1 | 5/2018 | Sengelaub et al. |
| 2018/0275428 A1* | 9/2018 | Ando ....................... G02C 7/06 |
| 2019/0293930 A1* | 9/2019 | Zhang ................... G06T 19/006 |
| 2020/0241635 A1 | 7/2020 | Cohen |
| 2021/0173474 A1* | 6/2021 | Sztuk ................... G06T 19/006 |

* cited by examiner

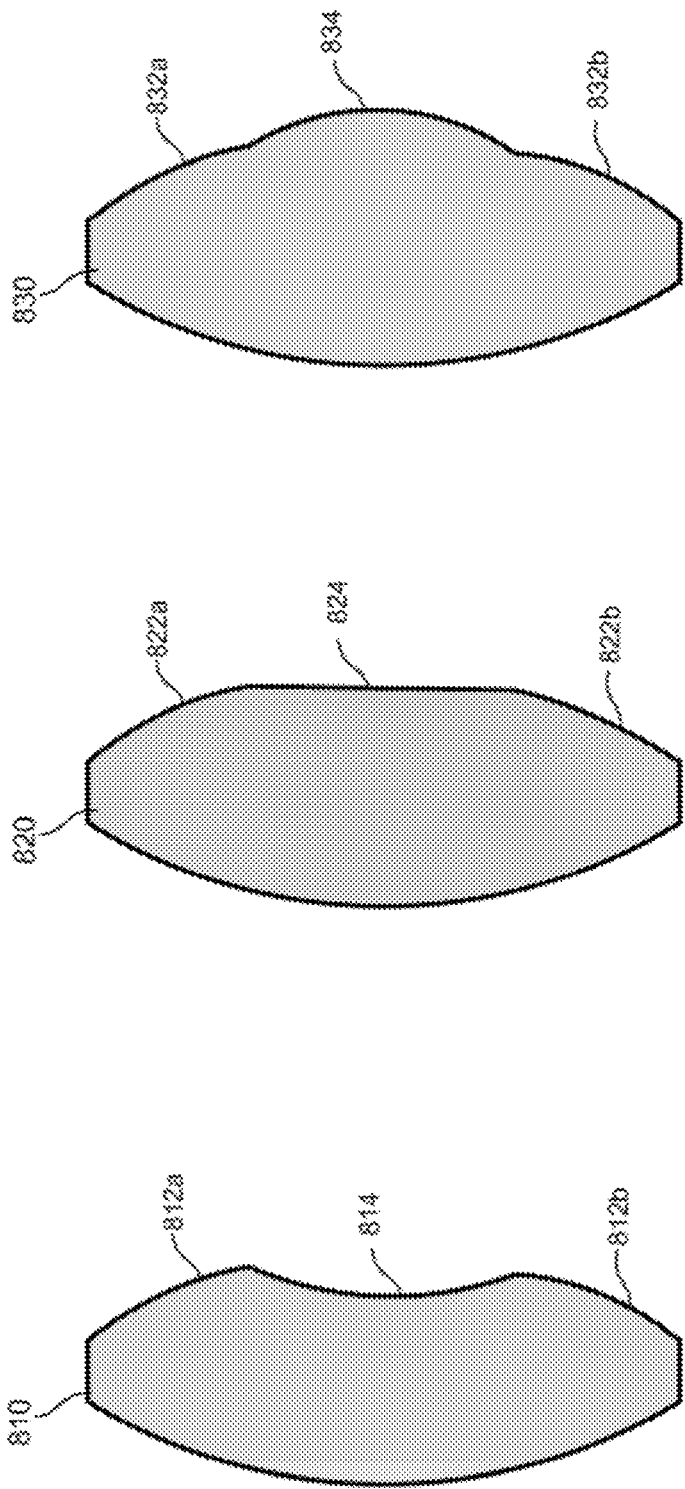

GLINT ANALYSIS USING MULTI-ZONE LENS

CROSS-REFERENCE TO RELATED APPLICATIONS

This patent application is the national stage of International Application No. PCT/US2021/050370 filed on Sep. 25, 2021, which claims the benefit of U.S. Provisional Application No. 63/081,378 filed on Sep. 22, 2020, "GLINT ANALYSIS USING MULTI-ZONE LENS," each of which is incorporated herein by this reference in its entirety.

TECHNICAL FIELD

The present disclosure generally relates to electronic devices, and in particular, to systems, methods, and devices for determining eye characteristics of users of electronic devices.

BACKGROUND

Existing eye-tracking techniques analyze glints that are reflected off of a user's eye and captured via an image sensor. Glints depicted in images captured by such image sensors may be saturated, for example, in circumstances in which relatively strong glint-producing lights are reflected from relatively specular eye surfaces. Such glint saturation may prevent existing eye-tracking techniques from accurately determining glint locations since the saturation may inhibit the ability to measure the center of mass of a glint (e.g., glint centroid) accurately. The eye-tracking system may lack accuracy and be sensitive to mechanical shocks. Thus, it may be desirable to provide a means of efficiently providing more accurate identification of the glints, e.g., by more accurately finding glint centroids.

SUMMARY

Various implementations disclosed herein include devices, systems, and methods that determine an eye characteristic (e.g., gaze direction, eye orientation, etc.) based on a determination of a location of a glint. An eye characteristic may be tracked or otherwise determined using glints reflected from an eye and captured by an image sensor. In some aspects, the glint tracking system uses a multi-zone lens that has a zone that spreads out a glint's energy received at the image sensor. Spreading the energy may improve eye tracking by enabling more accurate identification of a glint centroid using light spread from otherwise saturated field points (e.g., light spread into a halo in a point spread function). Additionally, spreading the energy using a multi-zone lens may further reduce errors resulting from lens aberrations, source power, aperture decenter, and the like.

In general, one innovative aspect of the subject matter described in this specification can be embodied in methods that include the actions of, at an electronic device having a processor, producing a glint by producing light that reflects off a portion of an eye, receiving the reflected light at a sensor, wherein the reflected light is received after passing through a multi-zone lens having a first zone and a second zone, the first zone and second zone having different energy-spreading characteristics, determining a location of the glint based on the reflected light received at the sensor, and determining an eye characteristic based on the determined location of the glint.

These and other embodiments can each optionally include one or more of the following features.

In some aspects, the first zone has a radius of curvature that differs from a radius of curvature of the second zone. In some aspects, the radius of curvature of the first zone spreads the received light more than the radius of curvature of the second zone in a point spread function (PSF). In some aspects, the radius of curvature of the first zone produces a distributed energy portion in the PSF by distributing energy of otherwise saturated field points. In some aspects, the distributed energy portion is a halo.

In some aspects, the first zone produces a distributed energy portion in a point spread function (PSF), and the second zone produces a focused energy portion in the PSF. In some aspects, the first zone includes a tilt such that the distributed energy portion is separate from a focused energy portion in the PSF.

In some aspects, determining the location of the glint includes determining a centroid of the received light. In some aspects, determining the eye characteristic includes determining locations of multiple portions of the eye based on determining locations of multiple glints.

In some aspects, the light is infrared (IR) light. In some aspects, the sensor includes an image sensor and receiving the reflected light includes receiving the reflected light from image data from the sensor. In some aspects, the electronic device is a head-mounted device (HMD).

In general, one innovative aspect of the subject matter described in this specification can be embodied in an eye-tracking system that includes a light source configured to produce light that reflects off a portion of an object, a multi-zone lens configured to allow the reflected light from the light source off the portion of the object to pass through the multi-zone lens, and a sensor configured to receive the reflected light after passing through the first zone and the second zone of the multi-zone lens. In some aspects, the multi-zone lens includes a first zone that includes a first radius of curvature, and a second zone that includes a second radius of curvature that differs from the first radius of curvature. In some aspects, the first zone and second zone have different energy-spreading characteristics These and other embodiments can each optionally include one or more of the following features.

In some aspects, the radius of curvature of the first zone spreads the received light more than the radius of curvature of the second zone in a point spread function (PSF). In some aspects, the radius of curvature of the first zone produces a distributed energy portion in the PSF by distributing energy of otherwise saturated field points. In some aspects, the distributed energy portion is a halo.

In some aspects, the first zone produces a distributed energy portion in a point spread function (PSF), and the second zone produces a focused energy portion in the PSF. In some aspects, the first zone includes a tilt such that the distributed energy portion is separate from a focused energy portion in the PSF.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 8A-8C illustrate example multi-zone lens for an eye-tracking system in accordance with some implementations.

Figure 1:
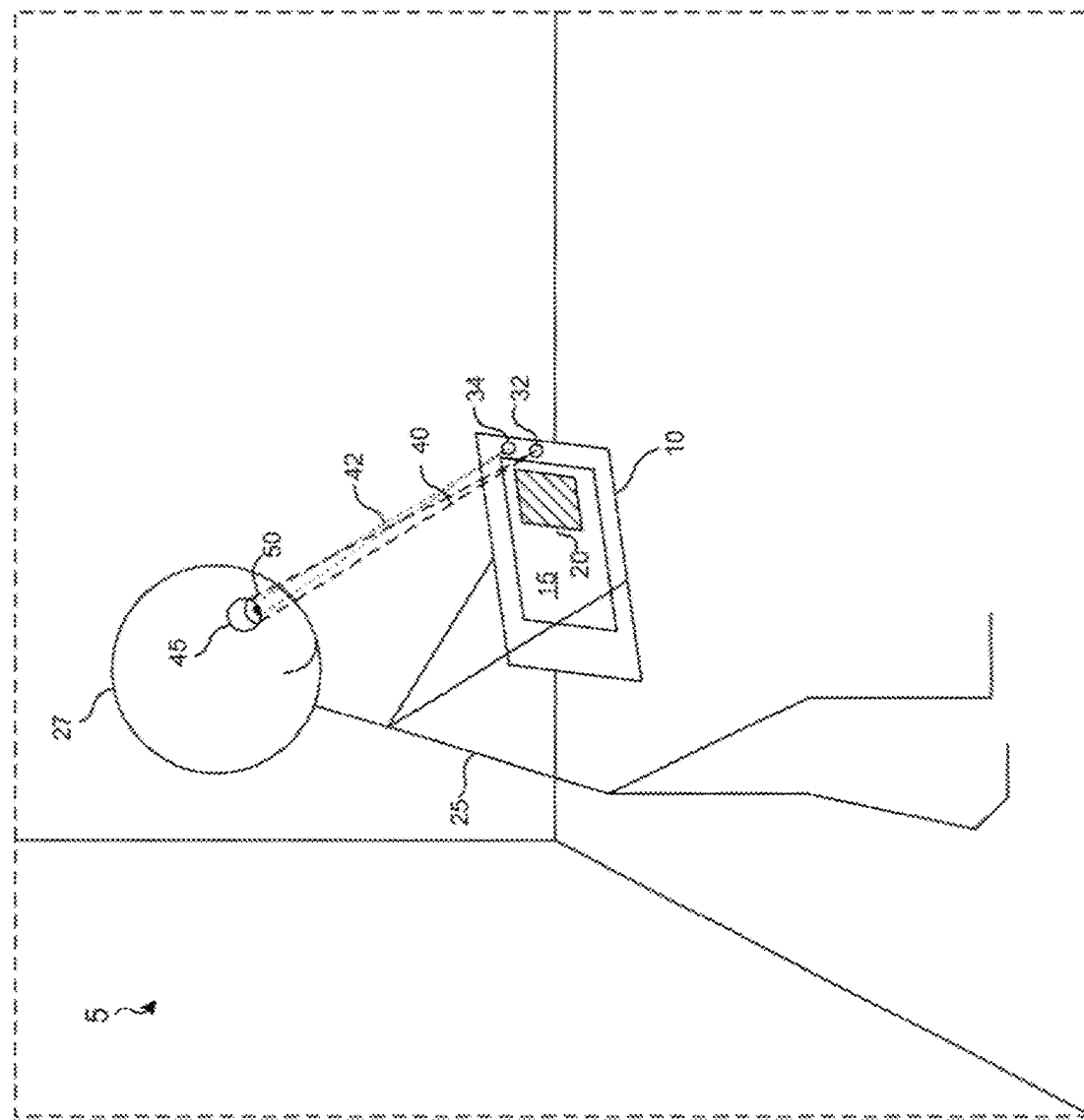
FIG. 1 illustrates a device displaying content and obtaining physiological data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of a real-world environment 5 (e.g., a room) including a device 10 with a display 15. In some implementations, the device 10 displays content 20 to a user 25. For example, content 20 may be a button, a user interface icon, a text box, a graphic, an avatar of the user or another user, etc. In some implementations, the content 20 can occupy the entire display area of display 15.

The device 10 obtains image data, motion data, and/or physiological data (e.g., pupillary data, facial feature data, etc.) from the user 25 via one or more sensors (e.g., sensor 32). For example, the device 10 obtains eye gaze characteristic data 40 via sensor 32. Additionally, the device 10 includes a light source 34 (e.g., a light-emitting diode (LED) that may be used to illuminate specular and diffusive parts of the eye 45 of the user 25.

While this example and other examples discussed herein illustrate a single device 10 in a real-world environment 5, the techniques disclosed herein are applicable to multiple devices as well as to other real-world environments. For example, the functions of device 10 may be performed by multiple devices, with the sensor 32 and light source 34 on each respective device, or divided among them in any combination.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable device such as a head-mounted device (HMD).

In some implementations, the device 10 includes an eye-tracking system for detecting eye position and eye movements via eye gaze characteristic data 40. For example, an eye-tracking system may include one or more infrared (IR) LEDs (e.g., light source 34), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye-tracking system may be analyzed to detect position and movements of the eyes of the user 25, or to detect other information about the eyes such as color, shape, state (e.g., wide open, squinting, etc.), pupil dilation, or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, one or both eyes 45 of the user 25, including one or both pupils 50 of the user 25 present physiological data in the form of a pupillary response (e.g., eye gaze characteristic data 40) detected from a glint analysis. The pupillary response of the user 25 may result in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

The user data (e.g., eye gaze characteristic data 40) may vary in time and the device 10 may use the user data to generate and/or provide a representation of the user.

Figure 2:
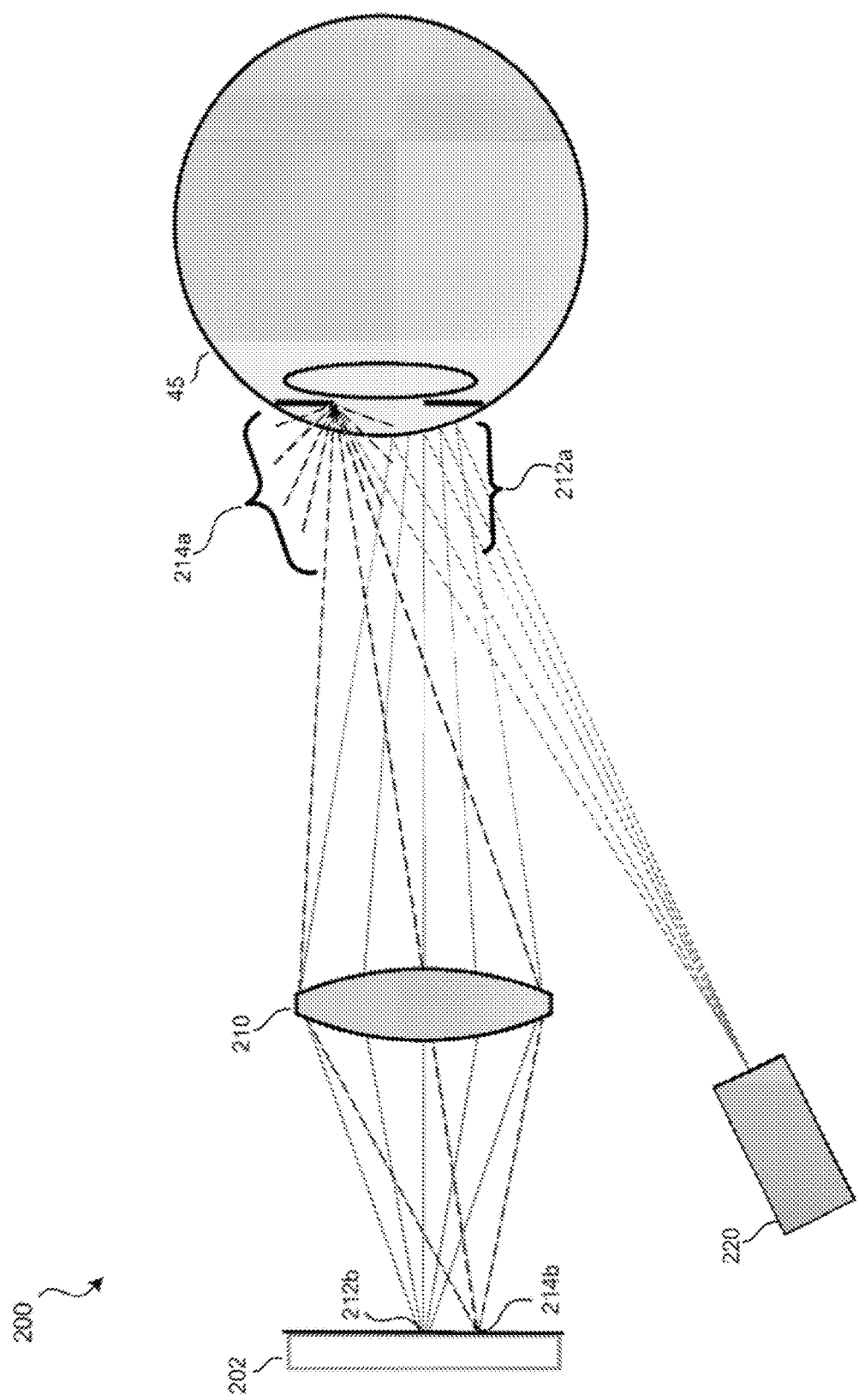
FIG. 2 illustrates an example eye-tracking system in accordance with some implementations.

FIG. 2 illustrates an example environment 200 of an eye-tracking system in accordance with some implementations. The eye-tracking system of example environment 200 uses a single light system to observe glints that the eye is reflecting from into a camera with a lens. For example, as illustrated in FIG. 2, the light source 220 (e.g., an LED or the like), illuminates the eye 45 of the user. The light waves are then reflected off of the cornea of the eye 45 and through the lens 210 and detected by the detector 202. In one aspect, the light source 220 is used both for illuminating specular and diffusive parts of an object (e.g., eye 45) and thus may provide at least a threshold level of illumination. Providing at least such a threshold level of illumination may result in glints that would, absent the use of techniques and devices disclosed herein, be saturated in images captured by a detector. For example, the specular glint light rays 212*a* produce a stronger signal at the detector at glint detection area 212*b*. The diffusive points at the object as illustrated at the diffusive light rays 214*a* produce a weaker signal at the detector at the diffuse detection area 214*b*. In some implementations, if the requirement of the eye-tracking system is to detect the center of the glint with high accuracy, then its saturation decreases accuracy and makes it more sensitive to mechanical shocks and the exact shape of the edges of the glint.

Figure 3:
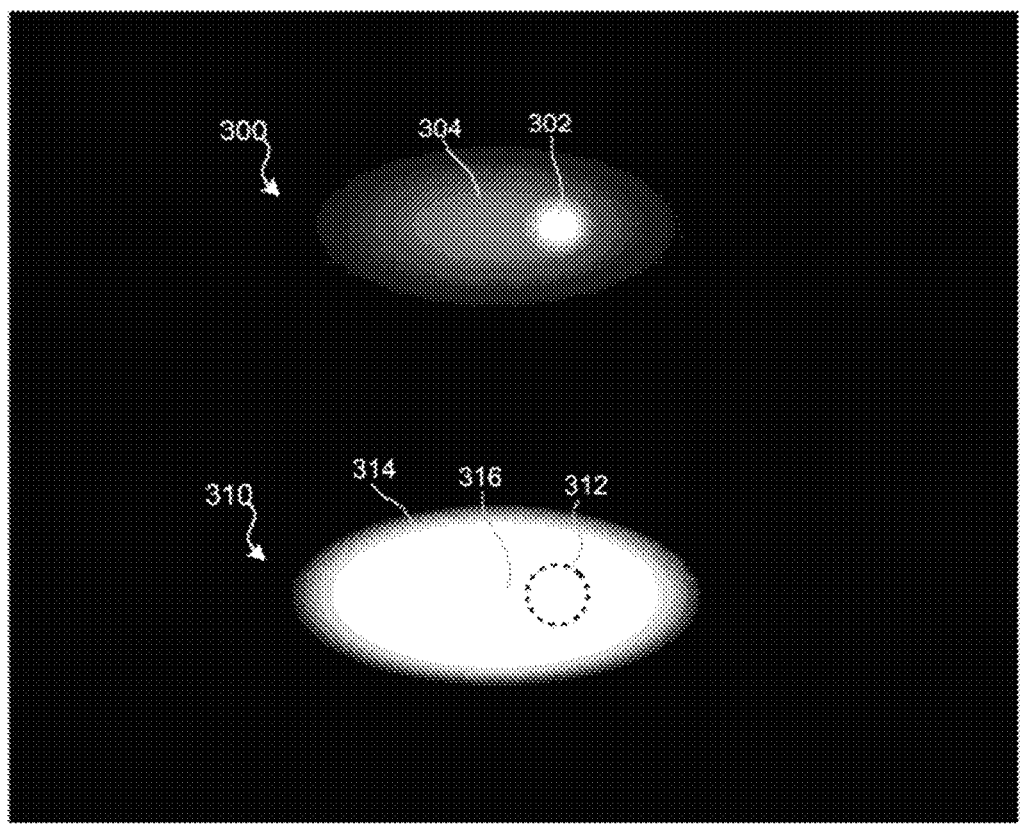
FIG. 3 illustrates the effect of saturation upon determination of a glint location.

FIG. 3 illustrates the effect of saturation upon determination of a glint location. An unsaturated glint is produced using a first illumination level. The response of the imaging system detector (e.g., point spread function 300) includes a bright portion 302 centered at the glint's actual location and an asymmetric tail 304 centered at a location other than the actual glint's location. Because the glint is not saturated, the location of the glint can be approximated with reasonable accuracy based on this information. Specifically, the centroid of the light represented by the PSF will occur at the approximately the center of the bright portion 302, which corresponds to the actual glint location.

In contrast, this is not the case when a saturated glint is produced using a second illumination level greater than the first illumination level. The response of the imaging system detector (e.g., point spread function 310) includes a bright portion 312 centered at the glint's actual location and an asymmetric tail 314 centered at a location other than the actual glint's location. However, because the glint is saturated, the asymmetric tail 314 is just as bright as the bright portion 312. Thus, the location of the glint cannot be determined based on this information. Specifically, the centroid 316 of the light represented by the PSF will occur near the center of the asymmetric tail 314, which differs from the location of the bright portion 312 at which the glint is actually located.

Figure 4:
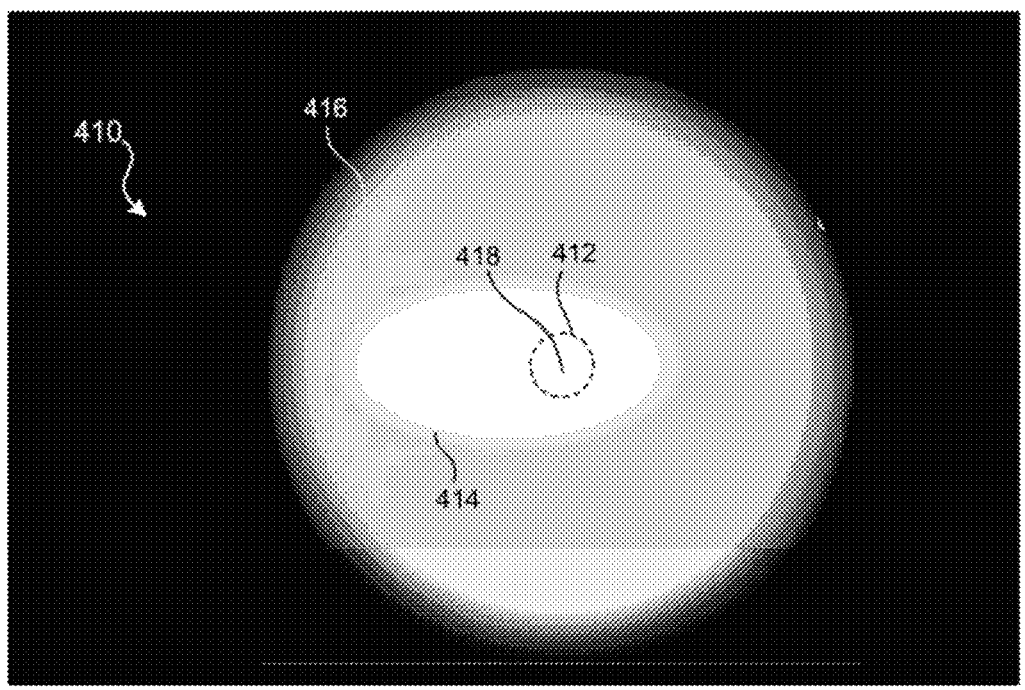
FIG. 4 illustrates how use of a lens in accordance with some implementations enables more accurate determination of a glint location of an otherwise saturated glint.

FIG. 4 illustrates how use of a lens according to implementations disclosed herein enables more accurate determination of a glint location of an otherwise saturated glint. In this example, a glint is produced using the second illumination level used to produce the saturated glint of FIG. 3. However, a detector uses a lens according to implementations disclosed herein such that the response of the imaging system detector (e.g., point spread function 410) includes a bright portion 412 centered at the glint's actual location, an asymmetric tail 414, and a halo 416. The halo 416, is produced by the lens and is centered around the glint's actual location. The location of the glint can be more accurately estimated from this information, e.g., by calculating the centroid 418 of the light represented in the point spread function 410, for example, using the non-saturated periphery.

In some implementations, the calculations described herein, such as calculating the centroid 418 of the light represented in the point spread function 410 using the non-saturated periphery, may be determined using algorithmic rules, machine learning models, and/or optimizations. For example, a machine learning model such as a neural network may input a representation of a lens (e.g., a multi-zone lens) and output a geometric PSF graph, e.g., positions, geometric boundaries, etc of light rays for a simulation of an eye-tracking system. Such a machine learning model may be trained using a supervised learning technique, for example, using manual annotations, based on user study data, e.g., identifying a centroid of the light represented in a point spread function.

Figure 5:
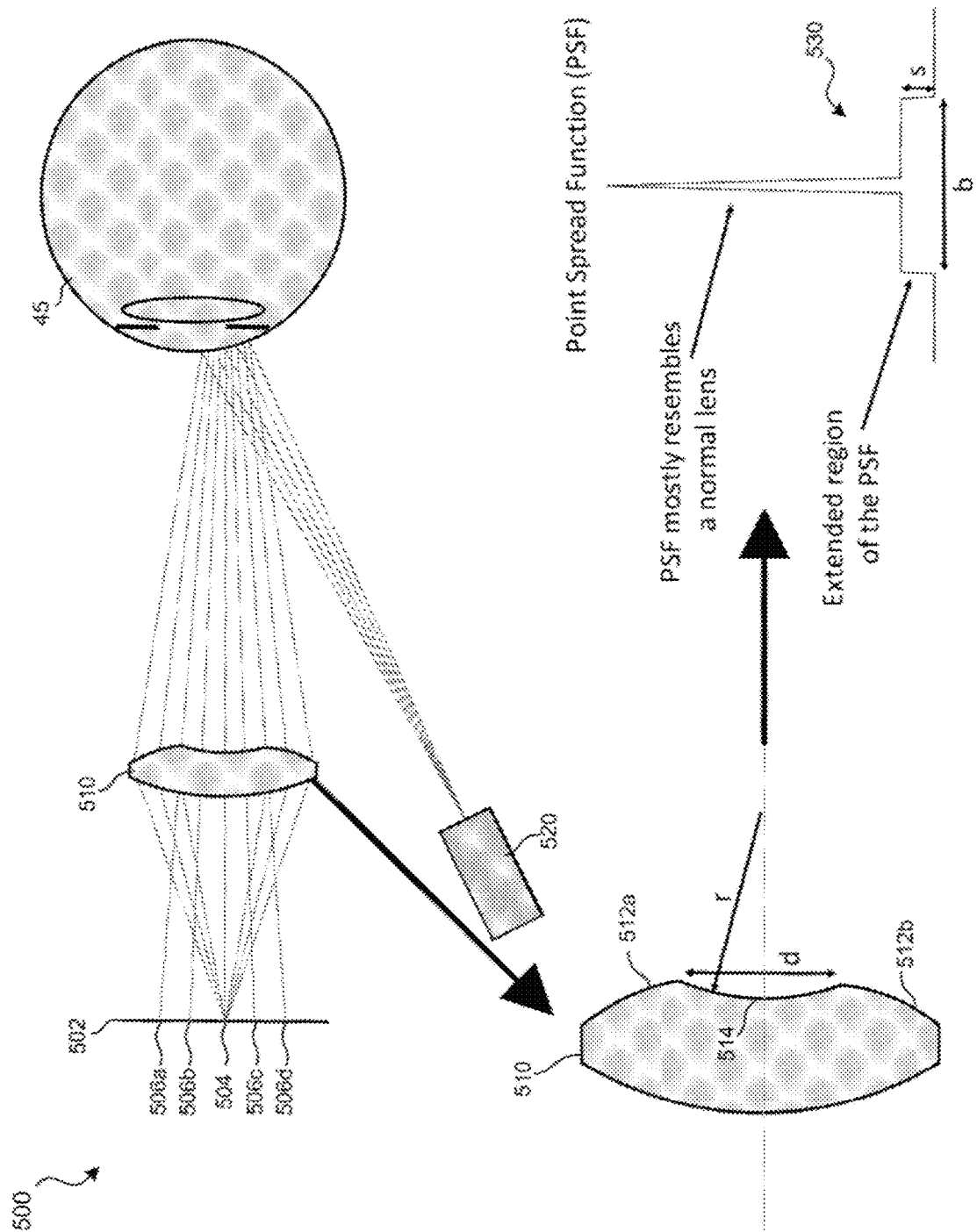
FIG. 5 illustrates an example eye-tracking system with a multi-zone lens in accordance with some implementations.

FIG. 5 illustrates an example environment 500 of an eye-tracking system with a multi-zone lens in accordance with some implementations. Similar to example environment 200, the eye-tracking system of example environment 500 uses a single light system to observe glints that the eye is reflecting from into a camera with a lens. However, lens 510 is a multi-zone lens (e.g., multi-zone lens 410*b*). For example, as illustrated in FIG. 5, the light source 520 (e.g., an LED or the like), illuminates the eye 45 of the user. The light waves are then reflected off of the eye 45 and through the multi-zone lens 510 and detected by the detector 502.

The multi-zone lens 510 includes a first zone 512 which includes an upper portion 512*a* and a lower portion 512*b* (e.g., the same radius of curvature as if it was one continuous lens). The upper portion 512*a* and the lower portion 512*b* have radial symmetry for the first zone 512. The multi-zone lens 510 further includes a second zone 514 (e.g., a different radius of curvature than the first zone 512). In second zone 514 may also be referred to herein as the "special zone". For example, the multi-zone lenses described herein may be multi element lenses where the special zone may be included on any of the elements on the lens, however, the most efficient location for the special zone would be the element that is closes to the top of the lens (e.g., the closest to the source of the reflection of the light rays from the eye 45 of the user). In some implementations, the special zone (e.g., second zone 514) may be created by a glass window added to an existing lens design. For example, the added glass window may have a central region that includes a negative or a positive curvature on one of its surfaces.

In one aspect, the light source 520 is used both for illuminating specular and diffusive parts of an object (e.g., eye 45), where the specular "glints" must be in saturation in order to detect the specular area of the object because the low energy that is returned from the diffusive parts of the object (compared to the specular). However, because of the different radius of curvature for the second zone 514, an extended region of the PSF can be obtained, and each of the light rays can be better detected at the detector 502, as shown. For example, the first zone 512 directs the light rays to one central part of the detector at central peak area (e.g., where light rays 504 intersect with the detector 502), while the second zone 514 will spread the light rays (e.g., light rays 506a-506d, hereinafter referred to as light rays 506) along the detector. Additionally, for example, PSF graph 530 looks like a sharp peak (e.g., central peak area where light rays 504 intersect with the detector 502) with a very wide circular top-hat area (e.g., light rays 506). In the example implementation, the wide circular area (e.g., also referred to herein as the extended region of the multi-zone PSF) will not be saturated, and the center peak would be calculated with high precision. For example, the length d of the second zone 514 can control the amount of energy that will go to the extended region of the PSF. The extended region size is controlled by the radius of curvature r of the second zone 514. Intensity s of the extended region is several orders of magnitude smaller than the peak, therefore the extended region of the PSF is unnoticeable for non-saturated field points, and the affect on image resolution will be negligible. For example, for highly saturated field points, the extended region can extend the field points to be larger with a non-saturation part.

Figure 6:
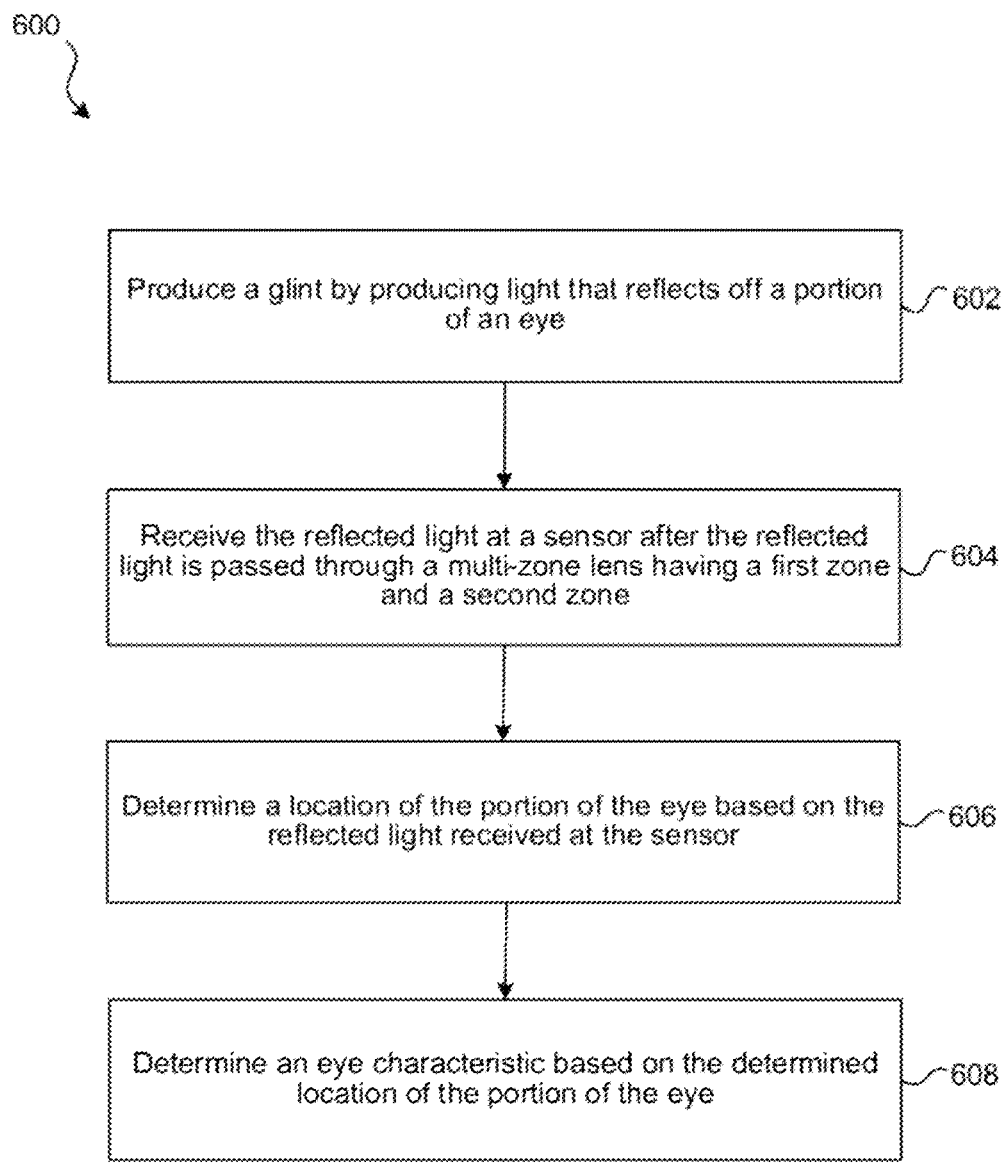
FIG. 6 is a flowchart representation of a method for determining an eye characteristic based on a determined location of a glint of a user's eye in accordance with some implementations.

FIG. 6 is a flowchart illustrating an exemplary method 600. In some implementations, a device (e.g., device 10 of FIG. 1) performs the techniques of method 600 to determine an eye characteristic of a user based on determining a location of a glint based on reflected light received at a sensor. In some implementations, the techniques of method 600 are performed on a mobile device, desktop, laptop, HMD, or server device. In some implementations, the method 600 is performed on processing logic, including hardware, firmware, software, or a combination thereof. In some implementations, the method 600 is performed on a processor executing code stored in a non-transitory computer-readable medium (e.g., a memory).

At block 602, the method 600 produces a glint (e.g., a specular reflection) by producing light that reflects off a portion of an eye. In some implementations, the glint may be a specular glint. In some implementations, if a light source is used both for illuminating specular and diffusive parts of the object (e.g., eye 45 of the user 25), the specular "glints" must be in saturation in order to detect the diffusive area of the object. For example, as illustrated in FIG. 5, and a light source 520 is flashed at an eye 45, and the detector 502 detects the glint such as the reflected light rays (e.g., light rays 504 and 506) from the eye 45 through the lens 510.

In some implementations, the light is IR light. In some implementations, the light source is a LED. Alternatively, another type of light source may be used that sufficiently provides a glint (the PSF of the glint can be detected by the eye-tracking system at the detector) when the light from the light source is projected onto the eye.

At block 604, the method 600 receives the reflected light at a sensor. For example, the sensor (e.g., detector 502) may be an IR image sensor/detector. In some implementations, the reflected light is received after passing through a multi-zone lens (e.g., lens 510) having a first zone and a second zone. For example, the first zone may be a halo-producing zone, and the second zone may be a zone with normal curvature (e.g., a standard concave portion). As illustrated in FIG. 5, the halo-producing zone is zone 514 that produces the extended region of the PSF in PSF graph 530, and the zone with normal curvature is zone 512a,b. In some implementations, the first zone and second zone have different energy-spreading characteristics (e.g., see PSF graph 530 in FIG. 5). For example, one zone (e.g., zone 512) may have a different curvature than the other zone (e.g., zone 514).

In some implementations, the first zone has a radius of curvature that differs from a radius of curvature of the second zone. For example, as illustrated in FIG. 5, the first zone 512 has a different radius of curvature than the second zone 514. In some implementations, the first and second zone are on the same side of face of the lens (e.g., lens 510). In some implementations, the radius of curvature of the first zone spreads the received light more than the radius of curvature of the second zone in a PSF (e.g., see PSF graph 530 in FIG. 5). In some implementations, the radius of curvature of the first zone produces a distributed energy portion in the PSF by distributing energy of otherwise saturated field points.

In some implementations, the distributed energy portion is a halo. For example, as illustrated in FIG. 4, the PSF 410 generates a halo effect (e.g., halo 416) for the distributed energy. In some implementations, the first zone produces a distributed energy portion in a PSF (e.g., halo 416), and the second zone produces a focused energy portion in the PSF (e.g., point spread function 410 that includes a bright portion 412 centered at the glint's actual location and an asymmetric tail 414 in FIG. 4).

In some implementations, the first zone includes a tilt such that the distributed energy portion is separate from a focused energy portion in the PSF. For example, the first zone may have a tilt, or the first zone may have a tilt at a different angle than the second zone. A multi-zone lens that includes a tilt is further described herein with reference to FIG. 9B.

At block 606, the method 600 determines a location of the glint based on the reflected light received at the sensor. For example, determining a location of the glint may include determining a centroid of the received light. In some implementations, multiple glints may be produced and located.

In some implementations, determining the location of the glint includes determining a centroid of the received light. For example, as illustrated in FIG. 4, the centroid 418 can be determined based on the non-saturated periphery (e.g., halo 416).

At block 608, the method 600 determines an eye characteristic based on the determined location of the glint. For example, the eye characteristic may include a gaze direction, eye orientation, or the like, for an eye-tracking system. For example, if the electronic device is a HMD, the eye-tracking system for the HMD can track gaze direction, eye orientation, etc. of a user.

In some implementations, determining an eye characteristic includes determining locations of multiple portions of the eye based on determining locations of multiple glints. For example, the light source 520 may illuminate the eye 45 in multiple areas creating more than one glint that may each be detected at the detector 502.

In some implementations, the sensor (e.g., detector 502) includes an image sensor and receiving the reflected light (e.g., light rays 504 and 506) includes receiving the reflected light from image data from the sensor. For example, detector 502 is an image sensor that acquires image data of the light rays 504 and 506 through the multi-zone lens 510.

Figure 7:
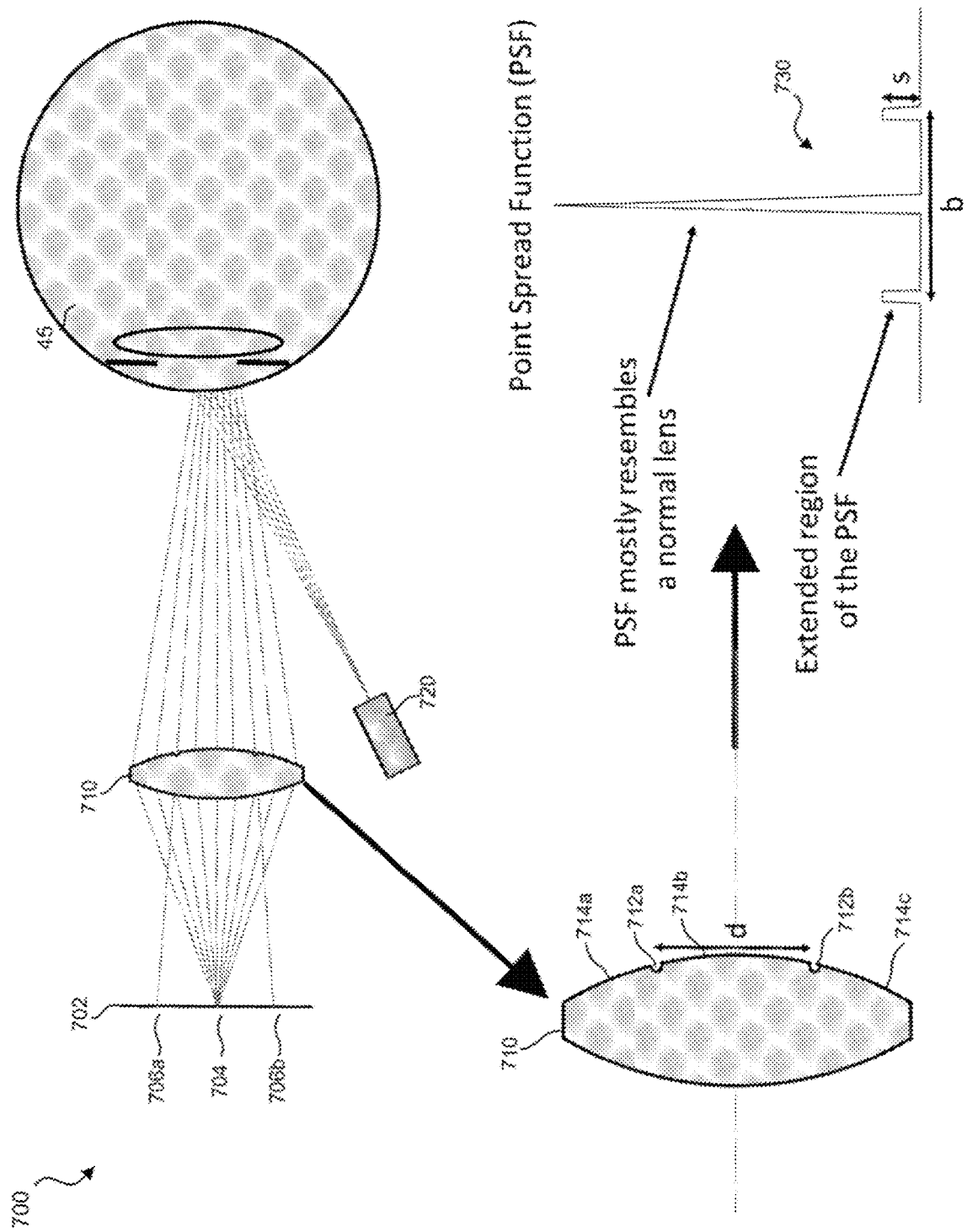
FIG. 7 illustrates an example eye-tracking system with a multi-zone lens in accordance with some implementations.

FIG. 7 illustrates an example environment 700 of an eye-tracking system with a multi-zone lens in accordance with some implementations. Similar to example environment 500, the eye-tracking system of example environment 700 uses a single light system to observe glints that the eye is reflecting from into a camera with a lens. However, lens 710 is a multi-zone lens that includes dips 712a,b (e.g., part of a ring around the lens) that are used to control the amount of energy in the ring portion of the PSF, as shown in PSF graph 730. For example, as illustrated in FIG. 7, the light source 720 (e.g., an LED or the like), illuminates the eye 45 of the user. The light waves are then reflected off of the eye 45 and through the multi-zone lens 710 and detected by the detector 702.

The multi-zone lens 710 includes a first main zone 714 which includes an upper portion 714a, a middle portion 714b, and a lower portion 714c (e.g., the same radius of curvature as if it was one continuous lens). The multi-zone lens 710 further includes two dips 712a,b. In one aspect, the light source 720 is used both for illuminating specular and diffusive parts of an object (e.g., eye 45), where the specular "glints" must be in saturation in order to detect the specular area of the object because the low energy that is returned from the diffusive parts of the object (compared to the specular). However, because of the dips 712a,b, an extended region of the PSF is obtained at the location of the two dips 712a,b. For example, the first zone 714 directs the majority of light rays to one central part of the detector at central peak area 704, while the dips 712a,b allow some lights to project onto the detector at two different locations (e.g., light rays 706a,b hereinafter referred to as light rays 706) along the detector. Additionally, for example, PSF graph 730 looks like a sharp peak (e.g., central peak area 704) with two smaller peaks for each dip (e.g., light rays 706) at the extended region of the multi-zone PSF which is part of the ring of the PSF. In the example implementation, the extended region of the multi-zone PSF will not be saturated, and the center peak would be calculated with high precision. For example, the length d of the middle portion 714b controls the amount of energy that will go to the extended region of the PSF. The extended region size is controlled by the radius of curvature r of the zone 714. Intensity s of each dip peak of the extended region is several orders of magnitude smaller than the central peak, therefore the extended region of the PSF is unnoticeable for non-saturated field points, and the effect on image resolution will be negligible. For highly saturated field points, the extended region can extend the field point to be larger with a non-saturation ring (e.g., having a thickness of the glint diameter). The size of the dips 712a,b controls the amount of energy for the ring portion of the PSF.

Alternatively, the dips 712a,b circumvent around the lens forming a continuous ring. For example, the dips 712a,b may have a shape of a ring with a flat plane of different curvature than the lens 710. In some implementations, a few rings (e.g., additional dips on the lens) can be applied to create a pattern of concentric rings, in order to increase the accuracy of the detection of the center of the glint.

FIGS. 8A-8C illustrate example multi-zone lens for an eye-tracking system in accordance with some implementations. In particular, FIG. 8A illustrates multi-zone lens 810, which is a concave multi-zone lens with a positive r. Multi-zone lens 810 is similar to multi-zone lens 510 of FIG. 5. The multi-zone lens 810 includes a first zone 812 which includes an upper portion 812a and a lower portion 812b (e.g., the same radius of curvature as if it was one continuous lens). The multi-zone lens 810 further includes a second zone 814 (e.g., a different radius of curvature than the first zone 812). FIG. 8B illustrates multi-zone lens 820, which is a plane multi-zone lens with an infinite r (e.g., flat plane). The multi-zone lens 820 includes a first zone 822 which includes an upper portion 822a and a lower portion 822b (e.g., the same radius of curvature as if it was one continuous lens). The multi-zone lens 820 further includes a second zone 824 (e.g., a flat plane, which is also a different radius of curvature than the first zone 822). FIG. 8C illustrates multi-zone lens 830, which is a convex multi-zone lens with a negative r. The multi-zone lens 830 includes a first zone 832 which includes an upper portion 832a and a lower portion 832b (e.g., the same radius of curvature as if it was one continuous lens). The multi-zone lens 830 further includes a second zone 834 (e.g., a different radius of curvature than the first zone 832). In an exemplary implementation, the diameter of the extended area of the PSF is controlled by the r value, and the difference between the curvature of the lens and the curvature of the special zone is monotonic with the size of the extended PSF area (e.g., b in PSF graph 530).

Figure 9B:
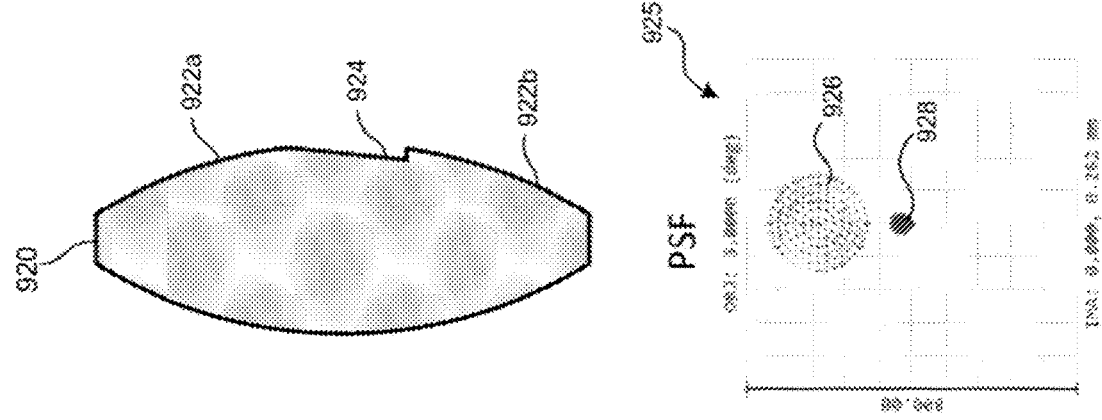
FIGS. 9A-9B illustrate example multi-zone lens for an eye-tracking system in accordance with some implementations.
Figure 9A:
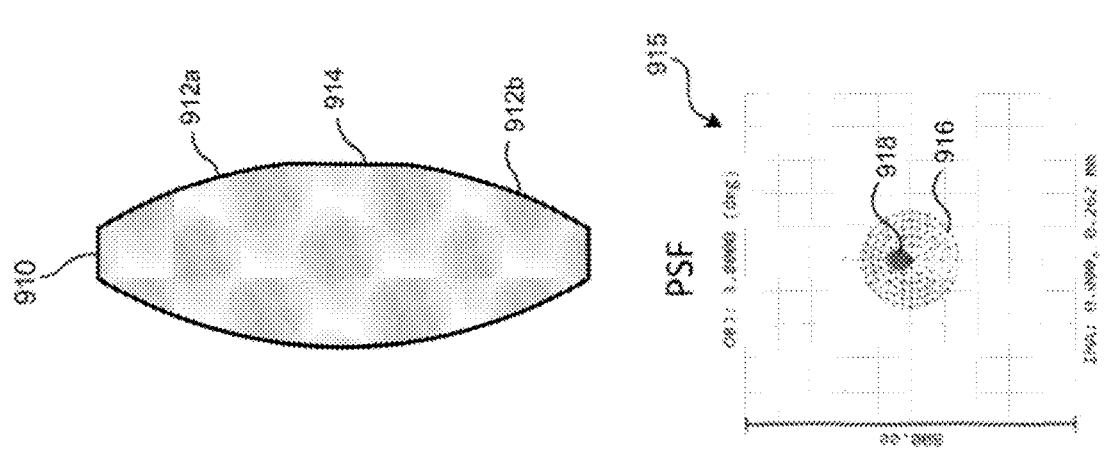

FIGS. 9A-9B illustrate example lens for an eye-tracking system in accordance with some implementations. In particular, FIG. 9A illustrates multi-zone lens 910, which is plane multi-zone lens with an infinite r (e.g., a flat plane). Multi-zone lens 910 is similar to multi-zone lens 820 of FIG. 8B. The multi-zone lens 910 includes a first zone 912 which includes an upper portion 912a and a lower portion 912b (e.g., the same radius of curvature as if it was one continuous lens). The multi-zone lens 910 further includes a second zone 914 (e.g., a flat plane, which is a different radius of curvature than the first zone 912). When reflected light is detected through lens 910, the resulting PSF is illustrated in PSF graph 915. For example, the saturated portion 918 detected from reflected light rays from the first zone 912 of the lens 910 is located in the center of the un-saturated halo 916 detected from reflected light rays from the second zone 914.

FIG. 9B illustrates multi-zone lens 920, which is plane multi-zone lens with an infinite r (e.g., a flat plane), but a portion of the center of the lens includes a tilt. The multi-zone lens 920 includes a first zone 922 which includes an upper portion 922a and a lower portion 922b (e.g., the same radius of curvature as if it was one continuous lens). However, the multi-zone lens 920 further includes a second zone 924 (e.g., a tilted flat plane, which is a different radius of curvature than the first zone 922). For example, if a tilt is added to the plane (or curved) zone at the center of the lens, a halo may form next to the glint instead of overlapping the glint, which can allow for calculating the centroid of the un-saturated halo more efficiently. In some implementations, the tilt may be added to the central area where it is has a flat curvature/plane as shown for lens 920. Alternatively, the tilt may be added to the central area where it is has a negative curvature (e.g., a concave lens with positive r such as multi-zone lens 510 and multi-zone lens 810), or a positive curvature (e.g., a convex lens with negative r such as lens multi-zone lens 830). As illustrated, the same example tilt for second zone 924 includes an added tilt of 1.7 degrees to the central area. When reflected light is detected through lens 920, the resulting PSF is illustrated in PSF graph 925. For example, the saturated portion 928 detected from reflected light rays from the first zone 922 of the lens 920 is separated from the un-saturated halo 926 detected from reflected light rays from the second zone 924. The separation of the saturated portion 928 from the un-saturated halo 926 allows for calculating the centroid of the un-saturated halo more efficiently.

Figure 10:
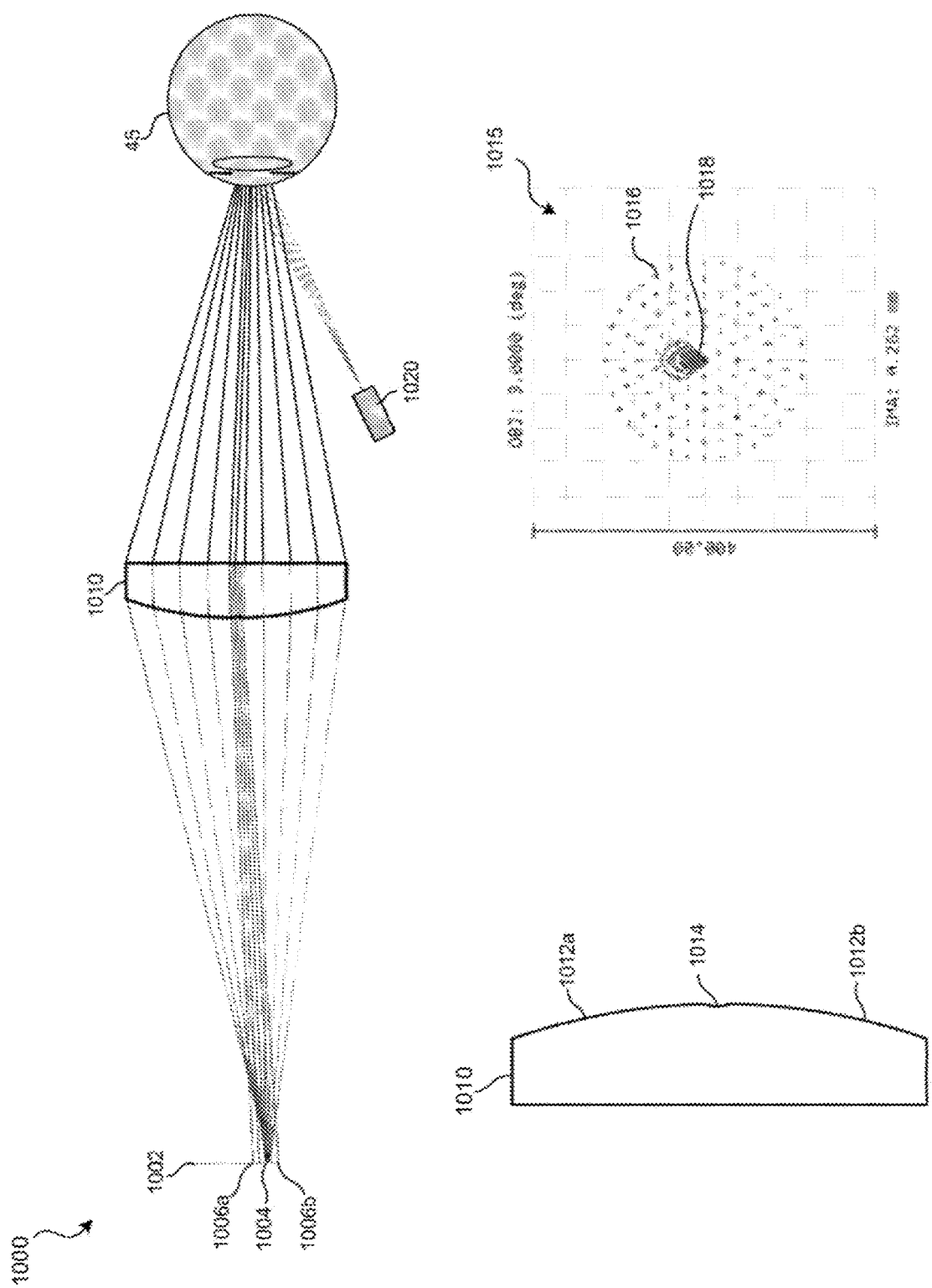
FIG. 10 illustrates an example coma aberration with a multi-zone lens for an eye-tracking system in accordance with some implementations.

FIG. 10 illustrates an example environment 1000 of an eye-tracking system with a multi-zone lens in accordance with some implementations. In particular example environment 1000 illustrates and example simulation of an off-axis field point (3 deg) in an aspheric singlet, showing significant coma aberration. Similar to example environment 200 and 500, the eye-tracking system of example environment 1000 uses a single light system to observe glints that the eye is reflecting from into a camera with a lens. Additionally, the lens 1010 is a similar concave multi-zone lens. For example, as illustrated in FIG. 10, the light source 1020 (e.g., an LED or the like), illuminates the eye 45 of the user. The light waves are then reflected off of the eye 45 and through the multi-zone lens 1010 and detected by the detector 1002. The multi-zone lens 1010 includes a first zone 1012 which includes an upper portion 1012a and a lower portion 1012b (e.g., the same radius of curvature as if it was one continuous lens). The multi-zone lens 1010 further includes a second zone 1014 (e.g., a different radius of curvature than the first zone 1012). When reflected light is detected through lens 1010, the resulting PSF is illustrated in PSF graph 1015. For example, the saturated portion 1018 detected from reflected light rays from the first zone 1012 (e.g., light rays 1006) of the lens 1010 is located in the center of the un-saturated halo 1016 detected from reflected light rays from the second zone 1014 (e.g., light rays 1004).

In an exemplary implementation, the overall length of the lens 1010 is ~2 mm, the first zone 1012a,b has a radius of curvature of ~2 mm and the length of the second zone 1014 is ~0.1 mm with a radius of curvature of ~2.6 mm. Example environment 1000 illustrates an off-axis field point (3 deg) in an aspheric singlet, showing significant coma aberration. In some implementations, an eye-tracking system could measure the centroid of the comatic saturated spot, but that may provide an error of ~25 microns compared to the chief light ray, and measuring the centroid of the comatic saturated spot may be sensitive to extremely small changes in aberrations during the lens' lifetime because the glint is saturated and low energy changes to the glint will result in centroid variation. However, in an exemplary implementation using techniques described herein, measuring the centroid of the un-saturated halo 1016 will give the actual chief ray center of the saturated portion 1018. Additional advantages of measuring the centroid of the un-saturated halo 1016 is that this technique will not be sensitive to changes in aberrations, source power, aperture decenter, and the like. For example, for the exemplary implementation, only ~0.25% of the energy would go through the central area of the lens at the second zone 1014, which would create the wide (halo) area of the PSF (e.g., un-saturated halo 1016). Therefore, the multi-zone lens 1010 and resulting PSF illustrated in PSF graph 1015 should not affect the resolution of the image. Additionally, the un-saturated halo 1016 will not be saturated and the halo 1016 would allow accurate measurements of the glint chief ray.

Figure 11:
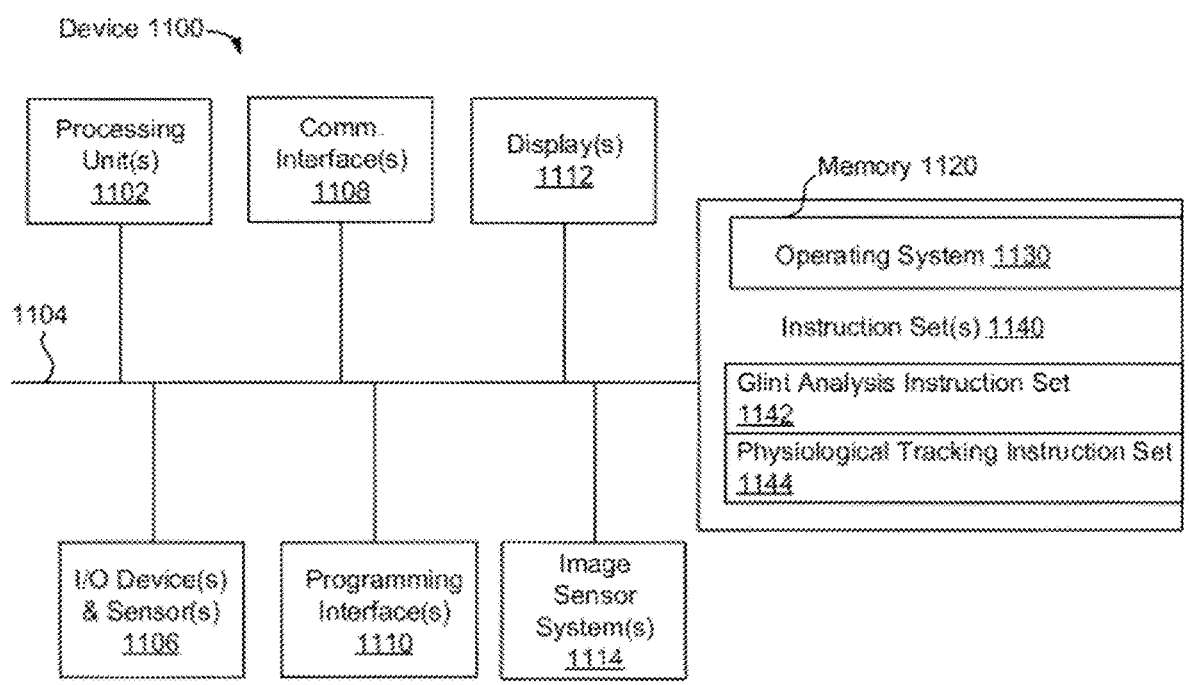
FIG. 11 is a block diagram illustrating device components of an exemplary device according to some implementations.

FIG. 11 is a block diagram of an example device 1100. Device 1100 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 1102 (e.g., microprocessors, ASICs, FPGAs, CPUs, CPUs, processing cores, and/or the like), one or more input/output (I/O) devices and sensors 1106, one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/ or the like type interface), one or more programming (e.g., I/O) interfaces 1110, one or more displays 1112, one or more interior and/or exterior facing image sensor systems 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 1112 are configured to present a view of a physical environment or a graphical environment to the user. In some implementations, the one or more displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 1112 correspond to diffractive, reflective, polarized, holographic, etc. waveguide displays. In one example, the device 10 includes a single display. In another example, the device 10 includes a display for each eye of the user.

In some implementations, the one or more image sensor systems 1114 are configured to obtain image data that corresponds to at least a portion of the physical environment 5. For example, the one or more image sensor systems 1114 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1114 further include illumination sources that emit light, such as a flash. In various implementations, the one or more image sensor systems 1114 further include an on-camera image signal processor (ISP) configured to execute a plurality of processing operations on the image data.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 includes a non-transitory computer readable storage medium.

In some implementations, the memory 1120 or the non-transitory computer readable storage medium of the memory 1120 stores an optional operating system 1130 and one or more instruction set(s) 1140. The operating system 1130 includes procedures for handling various basic system services and for performing hardware dependent tasks. In some implementations, the instruction set(s) 1140 include executable software defined by binary information stored in the form of electrical charge. In some implementations, the instruction set(s) 1140 are software that is executable by the one or more processing units 1102 to carry out one or more of the techniques described herein.

The instruction set(s) 1140 include a glint analysis instruction set 1142 and a physiological tracking instruction set 1144. The instruction set(s) 1140 may be embodied a single software executable or multiple software executables.

In some implementations, the glint analysis instruction set 1142 is executable by the processing unit(s) 1102 to determine a location of a glint based on reflected light received at a sensor. The glint analysis instruction set 1142 (e.g., enrollment instruction set 420 of FIG. 4) may be configured to receive reflected light at a sensor (e.g., an IR image sensor/detector) after passing through a multi-zone lens having a first zone (e.g., a halo-producing zone) and a second zone (e.g., normal curvature), where the first zone and second zone having different energy-spreading characteristics; (e.g., the first zone has a different curvature, a tilt, etc.). Additionally, the glint analysis instruction set 1142 may be configured to determine a location of a glint based on the reflected light received at the sensor. To these ends, in various implementations, the instruction includes instructions and/or logic therefor, and heuristics and metadata therefor.

In some implementations, the physiological tracking (e.g., eye gaze characteristics) instruction set 644 is executable by the processing unit(s) 1102 to track a user's eye gaze characteristics or other physiological attributes based on the determined location of the glint (e.g., from the glint analysis instruction set 1142) using one or more of the techniques discussed herein or as otherwise may be appropriate. To these ends, in various implementations, the instruction includes instructions and/or logic therefor, and heuristics and metadata therefor.

Although the instruction set(s) 1140 are shown as residing on a single device, it should be understood that in other implementations, any combination of the elements may be located in separate computing devices. Moreover, FIG. 11 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 12:
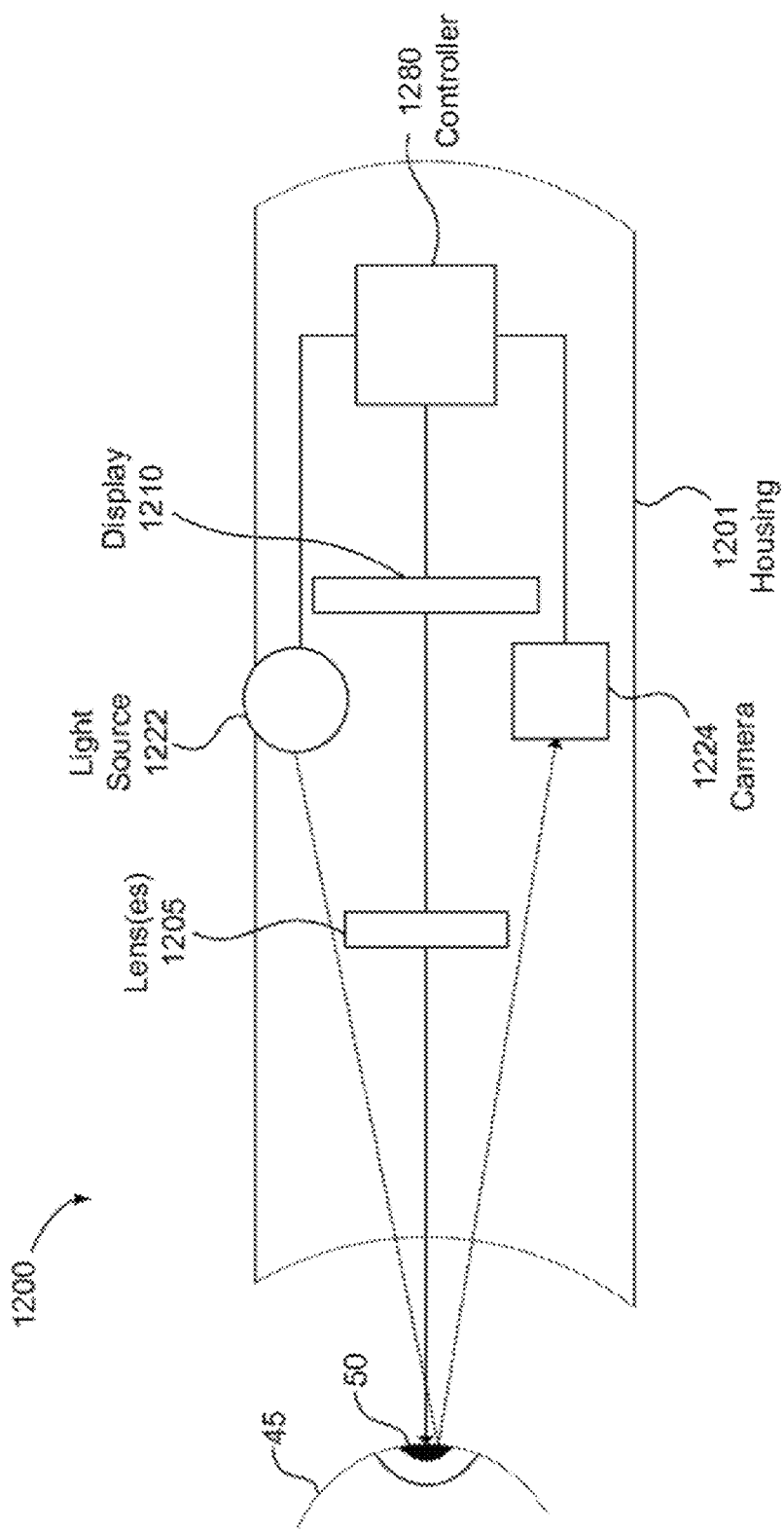
FIG. 12 is a block diagram of an example head-mounted device (HMD) in accordance with some implementations.

FIG. 12 illustrates a block diagram of an exemplary head-mounted device 1200 in accordance with some implementations. The head-mounted device 1200 includes a housing 1201 (or enclosure) that houses various components of the head-mounted device 1200. The housing 1201 includes (or is coupled to) an eye pad (not shown) disposed at a proximal (to the user 25) end of the housing 1201. In various implementations, the eye pad is a plastic or rubber piece that comfortably and snugly keeps the head-mounted device 1200 in the proper position on the face of the user 25 (e.g., surrounding the eye of the user 25).

The housing 1201 houses a display 1210 that displays an image, emitting light towards or onto the eye of a user 25. In various implementations, the display 1210 emits the light through an eyepiece having one or more lenses 1205 that refracts the light emitted by the display 1210, making the display appear to the user 25 to be at a virtual distance farther than the actual distance from the eye to the display 1210. For the user 25 to be able to focus on the display 1210, in various implementations, the virtual distance is at least greater than a minimum focal distance of the eye (e.g., 6 cm). Further, in order to provide a better user experience, in various implementations, the virtual distance is greater than 1 meter.

The housing 1201 also houses a tracking system including one or more light sources 1222, camera 1224, and a controller 1280. The one or more light sources 1222 emit light onto the eye of the user 25 that reflects as a light pattern (e.g., a circle of glints) that can be detected by the camera 1224. Based on the light pattern, the controller 880 can determine an eye tracking characteristic of the user 25. For example, the controller 1280 can determine a gaze direction and/or a blinking state (eyes open or eyes closed) of the user 25. As another example, the controller 1280 can determine a pupil center, a pupil size, or a point of regard. Thus, in various implementations, the light is emitted by the one or more light sources 1222, reflects off the eye of the user 25, and is detected by the camera 1224. In various implementations, the light from the eye of the user 25 is reflected off a hot mirror or passed through an eyepiece before reaching the camera 1224.

The display 1210 emits light in a first wavelength range and the one or more light sources 1222 emit light in a second wavelength range. Similarly, the camera 1224 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 1210 by looking at it), provide foveated rendering (e.g., present a higher resolution in an area of the display 1210 the user 25 is looking at and a lower resolution elsewhere on the display 1210), or correct distortions (e.g., for images to be provided on the display 1210).

In various implementations, the one or more light sources 1222 emit light towards the eye of the user 25 which reflects in the form of a plurality of glints.

In various implementations, the camera 1224 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1224 is an event camera including a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms.

These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   producing a glint by producing light that reflects off a portion of an eye;
   receiving the reflected light at a sensor, wherein the reflected light is received after passing through a first zone and a second zone of a multi-zone lens, the first zone and the second zone having different energy-spreading characteristics, wherein the first zone produces a distributed energy portion that comprises a halo, wherein the first zone produces a distributed energy portion in a point spread function (PSF), and the second zone produces a focused energy portion in the PSF;
   determining a location of the glint based on the reflected light that passed through the first zone and the reflected light that passed through the second zone received at the sensor; and
   determining an eye characteristic based on the determined location of the glint.

2. The method of claim 1, wherein the first zone has a radius of curvature that differs from a radius of curvature of the second zone.

3. The method of claim 2, wherein the radius of curvature of the first zone spreads the received light more than the radius of curvature of the second zone in a PSF.

4. The method of claim 3, wherein the radius of curvature of the first zone produces a distributed energy portion in the PSF by distributing energy of otherwise saturated field points.

5. The method of claim 1, wherein the first zone comprises a tilt such that the distributed energy portion is separate from a focused energy portion in the PSF.

6. The method of claim 1, wherein determining the location of the glint comprises determining a centroid of the received light.

7. The method of claim 1, wherein determining the eye characteristic comprises determining locations of multiple portions of the eye based on determining locations of multiple glints.

8. The method of claim 1, wherein the light is infrared (IR) light.

9. The method of claim 1, wherein the sensor comprises an image sensor and receiving the reflected light comprises receiving the reflected light from image data from the sensor.

10. The method of claim 1, wherein the electronic device is a head-mounted device (HMD).

11. A device comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the one or more processors to perform operations comprising:
    producing a glint by producing light that reflects off a portion of an eye;
    receiving the reflected light at a sensor wherein the reflected light is received after passing through a multi-zone lens having a first zone and a second zone, the first zone and the second zone having different energy-spreading characteristics, wherein the first zone produces a distributed energy portion that comprises a halo, wherein the first zone produces a distributed energy portion in a point spread function (PSF), and the second zone produces a focused energy portion in the PSF;
    determining a location of the glint based on the reflected light received at the sensor; and
    determining an eye characteristic based on the determined location of the glint.

12. The device of claim 11, wherein the first zone has a radius of curvature that differs from a radius of curvature of the second zone.

13. The device of claim 12, wherein the radius of curvature of the first zone spreads the received light more than the radius of curvature of the second zone in a PSF.

14. The device of claim 13, wherein the radius of curvature of the first zone produces a distributed energy portion in the PSF by distributing energy of otherwise saturated field points.

15. The device of claim 11, wherein the first zone comprises a tilt such that the distributed energy portion is separate from a focused energy portion in the PSF.

16. The device of claim 11, wherein determining the location of the glint comprises determining a centroid of the received light.

17. The device of claim 11, wherein determining the eye characteristic comprises determining locations of multiple portions of the eye based on determining locations of multiple glints.

18. An eye-tracking system, comprising:
- a light source configured to produce light that reflects off a portion of an object;
- a multi-zone lens configured to allow the reflected light from the light source off the portion of the object to pass through the multi-zone lens, wherein the multi-zone lens includes:
  - a first zone that includes a first radius of curvature, and
  - a second zone that includes a second radius of curvature that differs from the first radius of curvature, wherein the first zone and the second zone have different energy-spreading characteristics, wherein the first zone produces a distributed energy portion that comprises a halo, wherein the first zone produces a distributed energy portion in a point spread function (PSF), and the second zone produces a focused energy portion in the PSF;
- a sensor configured to receive the reflected light after passing through the first zone and the second zone of the multi-zone lens; and
- a processor configured to determine a location of a glint based on the reflected light that passed through the first zone and the reflected light that passed through the second zone received at the sensor.

19. The eye-tracking system of claim 18, wherein the radius of curvature of the first zone spreads the received light more than the radius of curvature of the second zone in a PSF.

20. The eye-tracking system of claim 19, wherein the radius of curvature of the first zone produces a distributed energy portion in the PSF by distributing energy of otherwise saturated field points.

\* \* \* \* \*